(12) United States Patent
Essien et al.

(10) Patent No.: US 8,919,899 B2
(45) Date of Patent: Dec. 30, 2014

(54) METHODS AND APPARATUSES FOR DIRECT DEPOSITION OF FEATURES ON A SURFACE USING A TWO-COMPONENT MICROFLUIDIC JET

(71) Applicants: Marcelino Essien, Cedar Crest, NM (US); David Michael Keicher, Albuquerque, NM (US)

(72) Inventors: Marcelino Essien, Cedar Crest, NM (US); David Michael Keicher, Albuquerque, NM (US)

(73) Assignee: Integrated Deposition Solutions, Cedar Crest, NM (US)

(*) Notice: Subject to any disclaimer, the term of this patent is extended or adjusted under 35 U.S.C. 154(b) by 0 days.

(21) Appl. No.: 13/891,982

(22) Filed: May 10, 2013

(65) Prior Publication Data

US 2014/0035975 A1 Feb. 6, 2014

Related U.S. Application Data

(60) Provisional application No. 61/645,225, filed on May 10, 2012.

(51) Int. Cl.
*B41J 29/38* (2006.01)
*B41J 2/07* (2006.01)
*B29C 67/00* (2006.01)
*B41J 2/21* (2006.01)

(52) U.S. Cl.
CPC ............... *B41J 2/07* (2013.01); *B29C 67/0059* (2013.01); *B41J 2/211* (2013.01)
USPC ............................................................ 347/6

(58) Field of Classification Search
USPC ...................... 347/6–8, 56, 61, 62, 65, 84, 85
See application file for complete search history.

(56) References Cited

U.S. PATENT DOCUMENTS

| | | | | |
|---|---|---|---|---|
| 4,473,830 A | * | 9/1984 | Piatt et al. ......................... | 347/7 |
| 4,734,711 A | * | 3/1988 | Piatt et al. ....................... | 347/17 |
| 6,572,223 B2 | * | 6/2003 | Delametter et al. .............. | 347/8 |
| 2010/0156970 A1 | * | 6/2010 | Ikushima .......................... | 347/8 |
| 2012/0147073 A1 | * | 6/2012 | Dahrea et al. ..................... | 347/7 |
| 2013/0155138 A1 | * | 6/2013 | Batchelor et al. ............... | 347/17 |

* cited by examiner

*Primary Examiner* — Kristal Feggins

(57) ABSTRACT

The object of the invention is the provision of methods and apparatuses for controlled direct printing of continuous films or discreet structures using a two-component liquid jet issuing from an orifice. The two liquids may be miscible or immiscible, and form an annularly propagating flow along the axis of a deposition head. The flow consists of an outer sheath liquid with a boiling point temperature that is approximately 10 to 40 degrees lower than that of an inner sample liquid. The exit channel of the head is heated so that the pressurized outer sheath liquid is raised to a temperature greater than the boiling point of the sheath liquid at the local atmospheric pressure. The outer liquid is evaporated as the jet exits the orifice and falls at atmospheric pressure. Deposited sample line widths are produced in the range from approximately 1 to 1000 microns.

19 Claims, 6 Drawing Sheets

Figure 1:
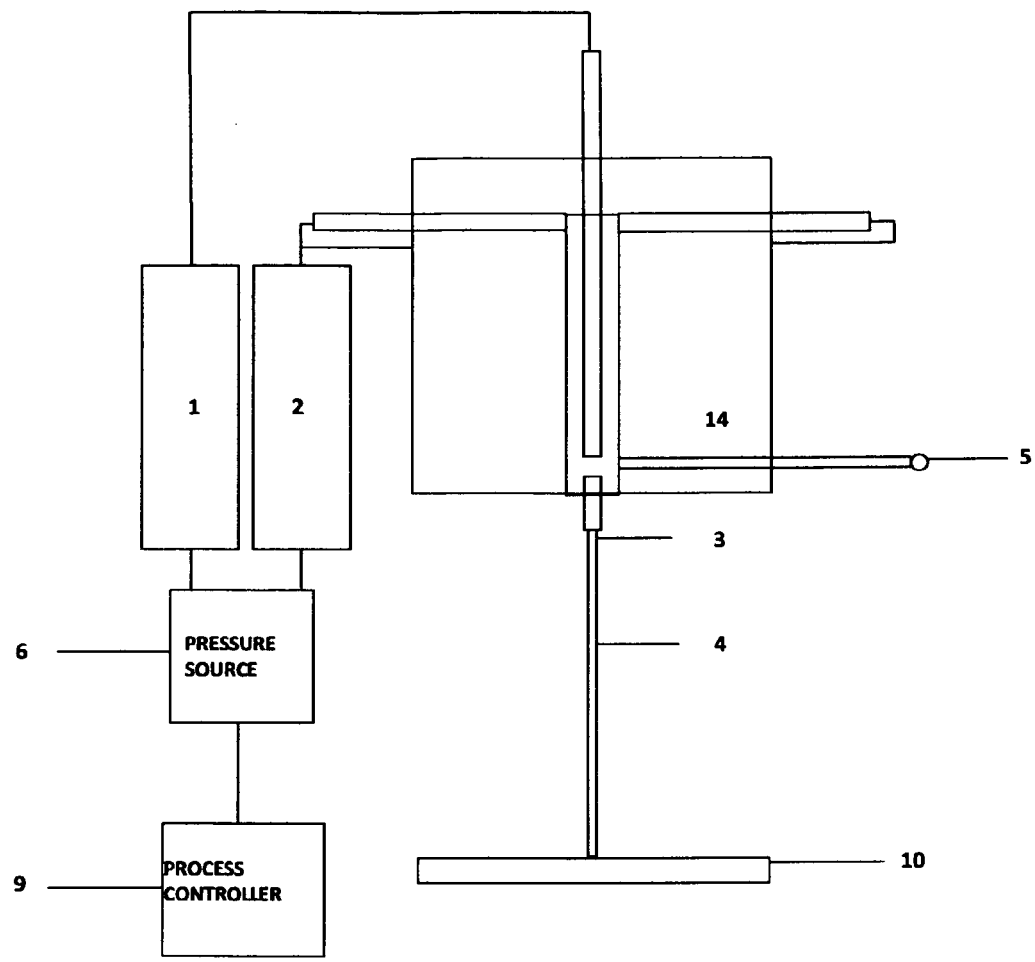

METHODS AND APPARATUSES FOR DIRECT DEPOSITION OF FEATURES ON A SURFACE USING A TWO-COMPONENT MICROFLUIDIC JET

RELATED U.S. APPLICATION DATA

Provisional application No. 61/645,225 filed May 10, 2012.

REFERENCES CITED

U.S. Patents

| | | |
|---|---|---|
| 3,416,730 | December, 1968 | Perry |
| 4,196,437 | April, 1980 | Hertz |
| 7,323,133 B2 | January, 2008 | Maccagnan et. al. |
| 8,187,888 | May, 2012 | Rich |
| 8,322,025 | December, 2012 | Fork et. al. |
| 8,361,413 | June, 2006 | Mott et. al. |
| 8,398,226 | March, 2013 | Higgins, et. al. |
| 8,398,935 B2 | March, 2013 | Howell et. al. |

Other Publications

Edmund, K. V. (2006). Stable Jets of Viscoelastic Liquids and Self-Assembled Cylindrical Capsules by Hydrodynamic Focusing. *Langmuir,* 9052-9056.

Habibi, M. (2010). Bucking of Liquid Columns. *Physical Review Letters,* 104, 074301.

Lei, S. (2011). Dripping and Jetting in Coflowing Liquid Streams. *Advances in Adaptive Data Analysis,* 3(1&2), 269-290.

Takahashi, T. (1969). Effect of Nozzle Length on Breakup of Liquid Jet. *Memoirs of the School of Engineering, Okahama University,* 4(1).

Utada, S. A. (2008). Absolute Instability of a Liquid Jet in a Coflowing Stream. *Phys. Rev. Lett,* 100.

FIELD OF THE INVENTION

Embodiments of the invention generally relate to microfluidic jetting devices, particularly devices for direct printing of features on a substrate.

BACKGROUND OF THE INVENTION

General Discussion of Liquid Jetting

It is well-known that a stable liquid jet is formed by forcing a liquid of sufficient viscosity through an orifice—(Edmund, 2006) Macroscopic liquid jets are observed in nature when a pressurized vessel containing a liquid of sufficiently low viscosity is punctured. The flow from the orifice created by the puncture produces a liquid jet with a flow rate that is dependent on the orifice diameter and the pressure within the vessel. Common examples of moderate viscosity jets are honey or oil flowing from an opening. It is also commonly known that jets of medium to low-viscosity liquids, i.e. water, ethylene glycol, and isopropanol, have inherent instabilities and can break up into droplets at varying distances from the jet orifice. Many studies however have been performed to confirm the stable propagation of medium to low-viscosity jets before filament breakup—(Habibi, 2010), (Edmund, 2006). Habibi has performed experimental studies of buckling of stable filaments of silicon oil ejected from an orifice: The silicon oil filaments propagated along distances as great as 60 cm. Edmund has studied the stability of a jet of a viscoelastic liquid formed using hydrodynamic focusing. (Takahashi, 1969) has reported liquid jets of water in air propagating to distances as large as 20 cm before breakup.

The Microfluidic Liquid Jet printing concept was inspired by the observation of stable jets of liquid commonly seen in nature. Examples of microfluidic liquid transport and microfluidic liquid jets are prevalent in nature. Indeed, over 40,000 known species of spiders exist, most of which are classified as web-spinning. Spider silk fibers are spun from pressurized abdominal sacs containing a polymeric solution. The jet dries in-flight to diameters of approximately 2.5 to 4.0 microns, and is used to make intricate patterned webs. The present invention produces a stable co-axial liquid jet by maintaining a constant pressure within a microfluidic flow cell used to form the co-axial liquid distribution.

General Description of Hydrodynamic Focusing

In hydrodynamic focusing, an annular distribution of a core liquid and a sheath liquid is forced through a channel or nozzle, with the core liquid being stretched into a thin filament as the liquids accelerate through the constriction. The width of the core filament is a function of the ratio of the core and sheath flow rates. In hydrodynamic focusing, the diameter of the core liquid is proportional to the fractional volume occupied by the core liquid. As the ratio of the core liquid flow rate to the sheath liquid flow rate is decreased, the volume occupied by the core liquid decreases, and thus reduces the diameter of the core liquid filament. In hydrodynamic focusing applications, the core liquid is stretched into a filament with a width as small as 1 micron.

Hydrodynamic Focusing for Direct Printing Applications

In a Direct Printing technique, a liquid is deposited onto a substrate without the use of masks or lithographic techniques. The present invention uses hydrodynamic focusing to form a thin filament of ink surrounded by a sacrificial sheath liquid. In one application of hydrodynamic focusing to direct printing, two miscible liquids with limited diffusivity are used to obtain focusing of the core liquid. The radius of the core liquid is proportional to the ratio of the core and sheath flow rates, and in application of the present invention, can be varied from approximately 1 micron to 1000 microns.

DESCRIPTION OF THE PRIOR ART

Microextrusion

In a microextrusion process a viscous liquid is forced through an orifice and into an ambient or vacuum environment to form a filament with a fixed cross sectional area. Examples of extrusion processes are synthetic fiber spinning applications for the textile industry and spinning applications and the production of optical fibers. Microextrusion processes can be used to form filaments of metals, polymers, and ceramics with widths ranging from several hundred nanometers to tens of microns.

Coextrusion

In a coextrusion process two liquids are combined in a flow cell to produce an annular flow of a sheath and core liquid. Examples of coextrusion include the manufacture of microscopic and macroscopic cladded optical fibers and hollow core optical fibers. The coextrusion process can be used to form polymer-coated glass optical fibers. Maccagnan (U.S. Pat. No. 7,323,133 B2) has disclosed a method for coextrusion of ceramic microtubes, defined as tubular structures with characteristic dimensions on the order of microns. Fork (U.S. Pat. No. 8,322,025) describes an apparatus for forming high-aspect ratio gridline structures using a coextrusion process.

Hydrodynamic Focusing

Many apparatuses and process have been described that use hydrodynamic focusing for various applications. A number of inventors have used hydrodynamic focusing to generate a thin liquid filament surrounded by a sheath liquid within a flow cell. Under general conditions, the filament breaks into droplets due to instabilities in the liquid column. In another case, the filament is stretched until particles suspended in the core liquid are aligned and propagate single file through an observation zone for cytometric analysis. Howell (U.S. Pat. No. 8,398,935 B2) discloses a method for the production of an annular flow of low and high viscosity liquids for the production of polymer fibers. Rich (U.S. Pat. No. 8,187,888) discloses an apparatus for a pressure-based liquid delivery system for a flow cytometry application.

Coaxial Jetting

A coaxial jet is formed when the inner filament and outer sheath liquid are jetted from an output orifice to form an annular liquid jet. In 1969 (U.S. Pat. No. 3,416,730), Perry disclosed an apparatus for the production of multiple liquid jets, initially in contact, but without substantial mixing. Hertz (U.S. Pat. No. 4,196,437) discloses a method and apparatus for forming a compound liquid jet that breaks into droplets in an inkjet printing application. The present invention produces a coaxial jet consisting of two liquid streams with limited diffusivity, producing a stable jet with a breakup distance of at least 5 cm.

Summary of the Invention

A BRIEF DESCRIPTION OF THE DRAWINGS

FIG. 1. A general embodiment of the microfluidic jetting device.

Figure 2:
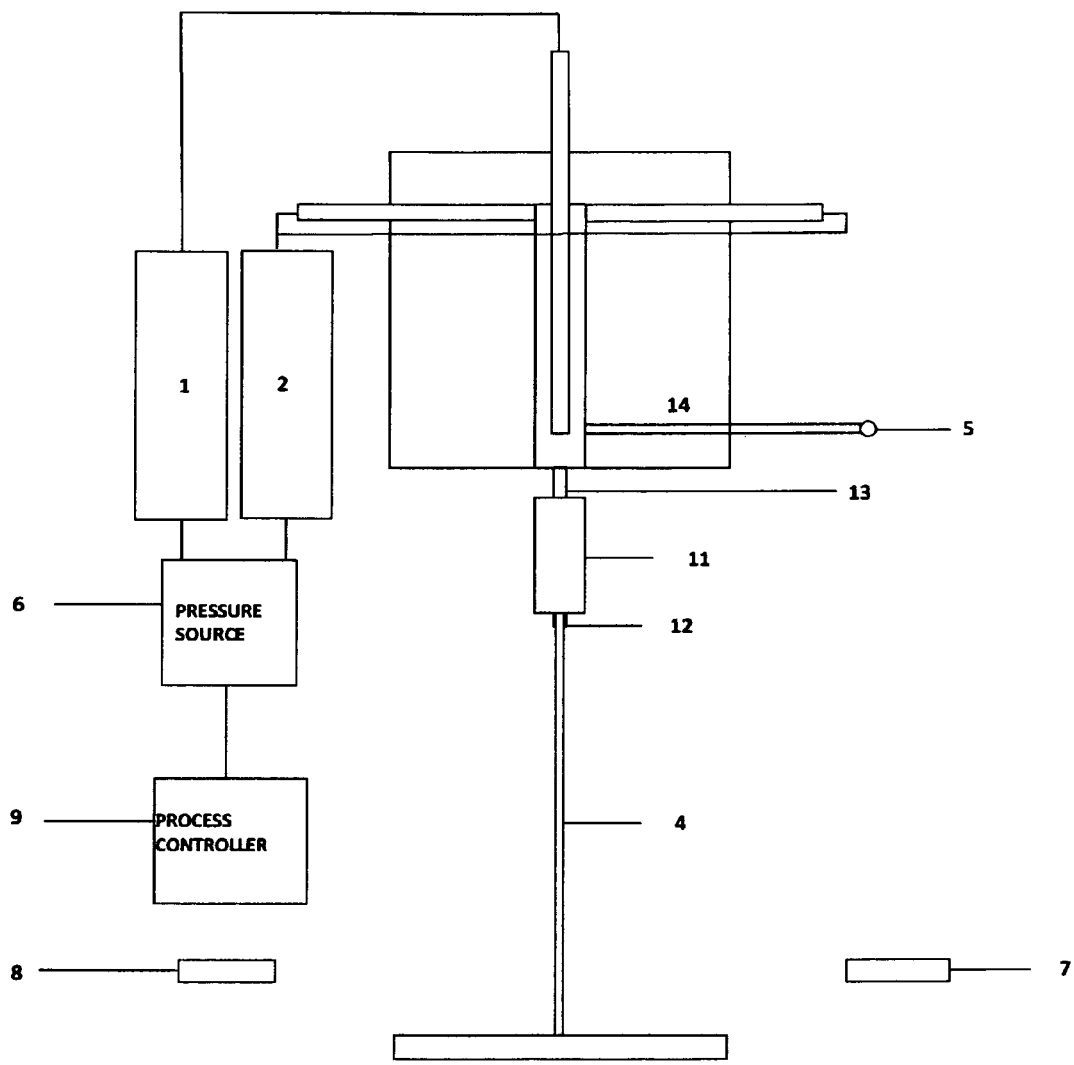

FIG. 2. A pressure-stabilized microfluidic jet.

Figure 3:
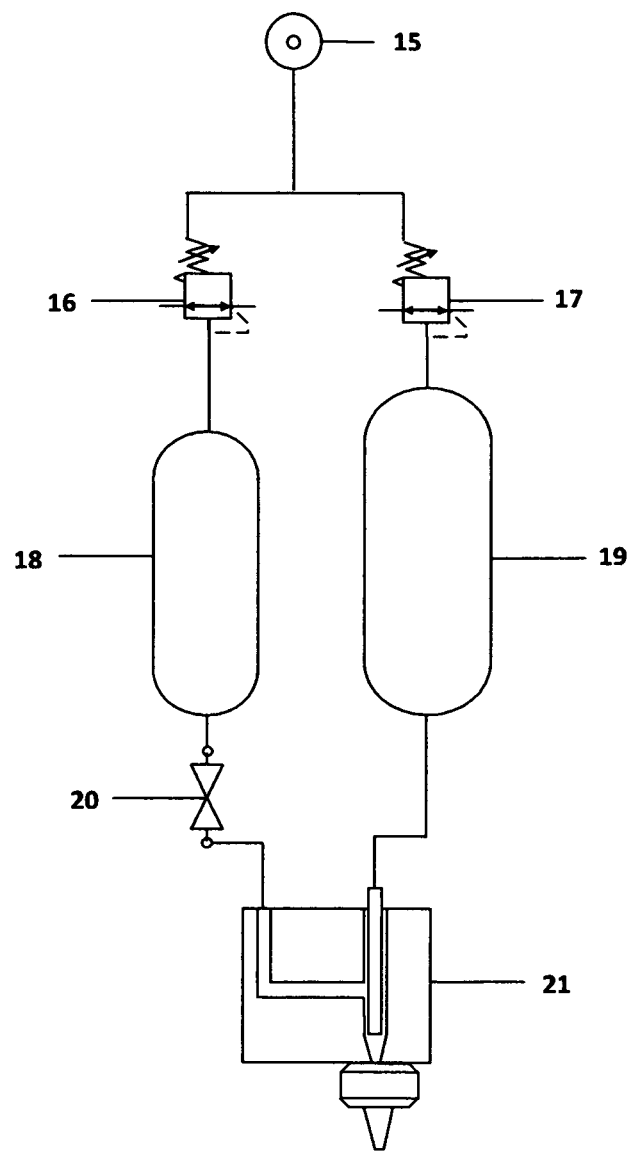

FIG. 3. A general schematic of the pressurized components of the invention.

Figure 4A:
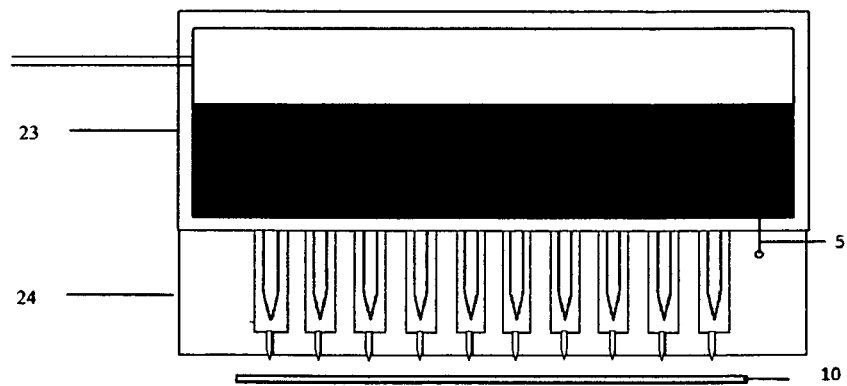

FIG. 4A. A 10-nozzle microfluidic jet.

Figure 4B:
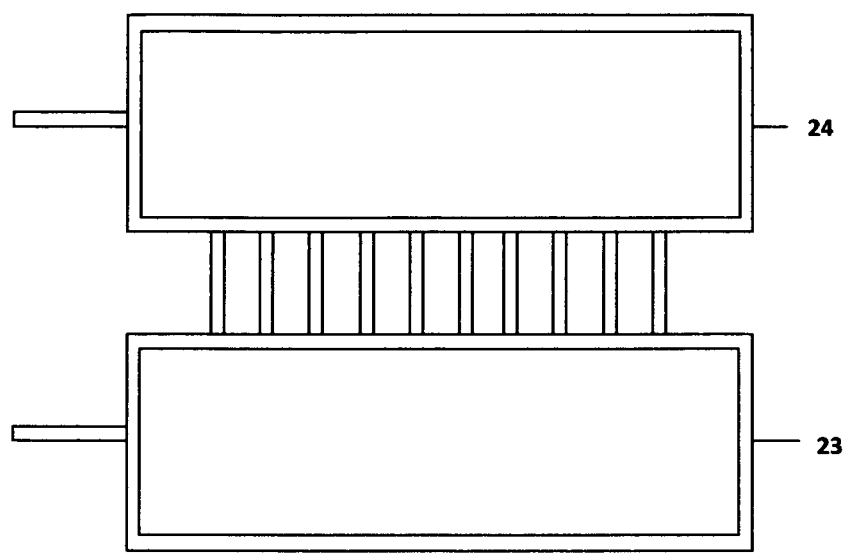

FIG. 4B. A 10-nozzle microfluidic jet.

Figure 5:
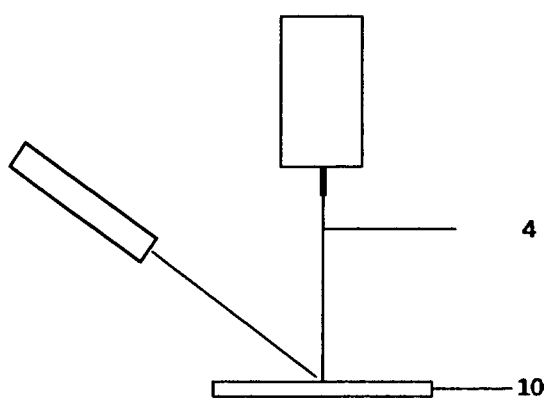

FIG. 5. A microjet/laser configuration.

A DETAILED DESCRIPTION OF THE PREFERRED EMBODIMENTS

Introduction

The invention provides for a method and apparatus for direct printing of microscopic to macroscopic features on a substrate in ambient conditions. Of particular interest is the provision of a process and apparatus for stable and repeatable deposition of various liquids onto substrates for additive manufacturing applications, including but not limited to metallization of rigid and flexible substrates, deposition of inorganic and organic samples for sensor applications, and deposition of various inks for green energy applications such as solar cell metallization and fuel cell development. The invention is used to produce a compound annular liquid jet consisting of a sheath and core liquid that propagates for up to 20 centimeters before breakup due to Rayleigh instabilities. The long nozzle to substrate distance allows for controlled evaporation of the sheath liquids using an external heater. A substrate is placed under the exit nozzle of the apparatus, at a height at which the jet is stable and continuous, so that a continuous printed feature is formed as the substrate is translated.

Two-Component Flow and Reduction of the Ink Deposition Rate

The feasibility of a liquid jet printing method depends largely on the ability of the process and apparatus to deliver ink to a substrate at a useful rate. The maximum practical deposition rate is determined by the maximum velocity and acceleration of state of the art motion control system. Stable delivery of an ink from a liquid jet apparatus becomes difficult for nozzle diameters less than approximately 50 microns. Indeed, clogging of small diameter nozzles by trapped bubbles or solid particles can be problematic for jetting systems, rendering such nozzles impractical for prolonged use. The invention circumvents the problem of clogging by using a two-component approach, in which an inner ink flow is forced through a nozzle in a dripping mode, while a sacrificial outer sheath flow is jetted through a larger diameter external nozzle. The relatively large diameter of the exit nozzle greatly reduces or eliminates the occurrence of clogging, and helps to stabilize the deposition process. The inner ink flow is forced through an inner nozzle at flow rates on the order of milliliters per hour, while the sheath liquid is transported through an exit nozzle at flow rates of tens of milliliters per hour.

The Jetting Regime (Utada, 2008) and (Lei, 2011) have reported that, in co-flowing systems of two immiscible liquids, the dripping to jetting transition is determined by the Weber number of the inner flow or the capillary number of the outer flow. The capillary number represents the relative effect between viscous forces and surface tension forces acting across the interface of two dissimilar liquids. The Weber number represents the relative effect between inertia and surface tension. The processes and apparatuses of the present invention operate in the regime in which the transition from dripping to jetting is determined by the capillary number of the sheath flow. An unperturbed liquid jet will eventually break up into droplets as the liquid column moves towards a configuration that minimizes its surface area. In the present invention, the physical and operational parameters of the system and the fluid properties of the liquids are chosen so that the breakup distance of the jet is greater than 10 cm, and as long as 20 cm.

General Description of the Device

In a generalized case, the device consists of a pressure source and sample chamber or a syringe pump, a deposition head, a liquid orifice, a nozzle heater, a substrate heater, and a process control system. A general embodiment of the device is shown in FIG. 1. Liquid samples are pumped to the flow cell 14 by a syringe pump, or by a pressure source 6 above the chambers containing the liquid samples. Liquids are delivered to a nozzle from sources 1 and 2. The nozzle position is fixed with respect to the deposition head, and a continuous stream of liquid is jetted from the nozzle orifice. The device parameters and fluid parameters are chosen such that in an inactive state, the surface tension force of the liquids is greater than the hydrostatic force of the column of liquid at the orifice 3. Fluid flow is initiated when the total downward force is greater than the surface tension force. The total downward force is increased by pressurizing the liquid. When the pressure at the liquid orifice reaches a value $P_0$ that is dependent on the jet orifice diameter, and the surface tension of the liquid, a jet 4 is produced. In the preferred embodiment, a two-component jet is ejected from the nozzle. The signal from a pressure transducer 5 is input to a process controller 9. A pressure feedback circuit is used to maintain the pressure within the system by controlling the liquid flow to the orifice. At an appropriate flow rate the resulting liquid filament forms a continuous line as it strikes a moving substrate before Rayleigh instabilities break the filament into individual droplets. Under the correct conditions involving jet diameter, flow rate, liquid viscosity, and substrate height and speed, a continuous line with sub-micron edge definition is printed on a substrate 10. Key to the deposition process is the practice of depositing the liquid onto a substrate with the substrate placed at a distance from the orifice that is less than the distance at which the jet breaks into droplets. Breakup of the jet occurs as a result of Rayleigh instabilities that invariably occur with increasing distance from the orifice. In one embodiment of the device immiscible liquids are chosen so that the outer liquid acts to focus the core liquid to diameters in the range from 1 to 100 microns. The apparatus and process parameters are chosen so that the liquid filament remains stable for distances from the exit orifice that are as large as 20 cm. The length of the filament allows for deposition of traces onto substrates with nonplanar surfaces and substrates with surface height variations of several centimeters. The ability of the invention to deposit onto surfaces with extreme topology greatly facilitates printing on three-dimensional surfaces, since the width of the filament is constant until breakup, allowing for an orifice to substrate distance (working distance) as large as 20 cm.

Apparatus and Process Parameters

The object of the invention is direct printing of electronic inks and various liquid compositions onto various substrates. In order for the deposition process to be feasible, an upper limit of the sample deposition rate is set by the maximum achievable speed and acceleration of typical motion control systems. The flow is continuous, and the upper limit of the flow rate $Q_{max}$ is generally in the range of approximately 1 to 5 ml/hr. The flow rate through an orifice is inversely proportionate to the orifice diameter, and for inks with viscosities in the range of 1 to 5 cP, a practical $Q_{max}$ is obtained with orifice diameters from approximately 10 to 25 microns. An apparatus using an orifice diameter greater than approximately 50 microns will produce flow rates that are too large to be useful for conventional direct printing. The continuous jetting process however becomes problematic due to clogging for orifice diameters less than approximately 50 microns. The present invention uses a two-component flow to reduce the effective diameter of the orifice by channeling the sample liquid (ink) through a sacrificial sheath liquid. The sheath and sample liquids form an annular flow, with the sample liquid in the interior of the flow. The liquids exit the nozzle orifice, and the sheath liquid is evaporated as the pressurized liquid column is jetted into the ambient atmosphere.

The sheath liquid is partially or fully evaporated during the jetting process. Evaporation of any residual sheath liquid is accomplished by heating the substrate to within 1 to 10 degrees of the sheath liquid boiling point. Evaporation of the sheath liquid thus results in the deposition of a trace formed from the core filament.

Rapid Evaporation of the Sheath Liquid—Conversion of Superheat to Latent Heat of Vaporization In one embodiment of the device, a thermal assist is used to preferentially evaporate the sheath liquid from the compound jet. The sheath liquid is a sacrificial flow that reduces the diameter and the flow rate of the sample liquid as the flows emerge from the exit orifice. Fine line printing is facilitated when the sheath flow is partially or completely evaporated before striking the substrate. Rapid evaporation of the sheath flow is accomplished by using a heater assembly to superheat the pressurized sheath liquid. The sheath liquid is held above atmospheric pressure within the sheath chamber, flow cell, and exit channel, at a temperature above the boiling point of the sheath liquid at atmospheric pressure. As the sheath liquid exits the orifice and encounters the reduced ambient pressure, the energy used to raise the liquid above its atmospheric pressure boiling point is converted to latent heat of fusion, and rapid evaporation of the sheath liquid takes place.

In the preferred embodiment, the inner sample liquid has a boiling point that is substantially higher than that of the sheath liquid, so that the flow exiting the orifice consists of a partially or fully vaporized sheath component and a liquid inner sample component. The combined flow strikes a moving substrate, and produces a continuous line of the sample material.

Limited Diffusion and Viscoelastic Core Liquids

In some inkjet printing applications, viscoelastic inks are used to improve the deposition quality of the printed droplets. (Morrison, 2010) provides a summary of the use of viscoelastic inks formulations in inkjet printing. A viscoelastic ink will undergo an increase in viscosity has the strain rate on the liquid is increased. In inkjet printing, viscoelastic inks are used to minimize the formation of satellite droplets. Higgins (U.S. Pat. No. 8,398,226) discloses and inkjet printing system in which the rheology of an ink changes with the application of a temperature gradient, so that the viscosity of the ink increases upon deposition. Similarly, viscoelastic inks can be used in a two-component jet to improve the print quality of the deposited filament.

Process Control Using a Pressure/Light Intensity Feedback Loop

The maintenance of a stable jet will depend on the ability of the device to produce a stable pressure at the flow cell exit orifice. Referring to FIG. 2, a feedback loop is established between a pressure transducer 5 in communication with the liquid volume above the exit orifice. A pressure source 6 controls the flow of liquids to the orifice. An optical sensing device measures the diameter of the jet, and forms a feedback loop between the pressure transducer and the pressure source 6. A collimated light source 7 is placed in line with a photodiode 8, and a portion of the liquid column is illuminated. Signals from the sensors are processed by a controller 9, and a predetermined pressure is maintained at the orifice by adjusting the pump rate or the gas pressure above the sample liquid. The feedback loop is used to prevent the jet from breaking into individual droplets due to non-optimum jetting parameters, so that deposition is obtained directly from a stable liquid column. The feedback loop also maintains the size of the deposited feature by adjusting the process parameters to hold the jet diameter constant. The width of the deposited line depends on the physical parameters of the device and the fluid parameters of the liquid, and may generally be in the range of approximately 0.1 to 1 mm. The deposited line will be free of satellite droplets if deposition is accomplished with the jet in a stable mode. With the inclusion of a heater assembly 11, placed in contact with the exit channel 13, the range of the device is extended. In the case of the liquid jet of FIG. 2, line widths may be produced in the range of 1 to 1000 microns. The width of the liquid column and the deposited feature is decreased as the column flows through the orifice. FIG. 3 shows the pneumatic components of the microfluidic print head. A pressure source 15 is connected to pressure regulators 16 and 17. A sample chamber 18 is connected to pressure regulator 16, while a sheath chamber 19 is connected to pressure regulator 17. A valve 20 interrupts the flow of the sample liquid to the flow cell 21.

Valving and Shuttering

The present invention provides for valving of the core liquid and shuttering of the sheath liquid. Shuttering of the compound core and sheath liquid jet is also possible. Interruption of the jet to the substrate surface must be accomplished for printing of discreet structures without the use of masks or stencils. In one embodiment a mechanical shutter consisting of a hollow tube connected to a collection chamber and an electromechanical actuator is used to shutter the jet and to collect the core and sheath liquids. In still another embodiment, an electromechanical valve is placed in the core liquid deliver conduit, so that shuttering of the core liquid flow is achieved without interruption of the sheath flow. In the case of a shuttered inner liquid flow, the jet becomes a single component jet composed of a column of the sheath liquid with a diameter equal to that of the compound jet.

Optical Fiber Exit Orifice

In another embodiment, an optical fiber is coupled to the exit channel 13 and forms the nozzle 12 of FIG. 2. The optical fiber configuration is used to produce jet diameters in the range from approximately 1 to 50 microns. In order to reduce the pressure drop along the fiber axis, the fiber length is held between approximately 2 to 10 millimeters. The exit channel and optical fiber nozzle are heated by the heater 11 of FIG. 2. In another embodiment, the exit channel and exit nozzle are heated separately by two distinct and individually controlled heaters. In a general embodiment the exit channel and nozzle can be detached from the deposition head and replaced with another channel/nozzle assembly with a different channel diameter and/or a different nozzle orifice diameter, so that the range of the widths of printed features is extended from approximately 1 micron to 1 millimeter.

Multi-Nozzle Liquid Jet Arrays

The general design of invention is applicable to the manufacture of multi-nozzle arrays. An embodiment of a multi-nozzle liquid jet array is shown in FIG. 4A. The core liquid reservoir 23 is in communication with a 10-nozzle array, such that the pressurized fluid is forced through the individual nozzles in a dripping mode. The individual jets also share a sheath liquid reservoir, FIG. 4B, where a sheath liquid enters the flow cell through a heated sheath manifold 24. FIG. 4B is an overhead view of FIG. 4A.

Laser-Assisted Liquid Jet Deposition

In another embodiment the apparatus of FIG. 2 is configured so that the liquid jet is intercepted at the substrate by a focused laser beam. The configuration is shown in FIG. 5. The laser distribution 12 provides preferential heating of the sample liquid. The configuration allows for deposition of features with line widths less than 10 microns. The laser jet configuration allows for controlled heating and evaporation of the deposited liquid while minimizing heating of a transparent or nearly transparent, or opaque substrate. In some cases uncontrolled spreading of the jetted liquid will occur as the liquid strikes the substrate. Increasing the viscosity of the liquid just above the deposition zone changes the fluid dynamics so that uncontrolled spreading and even splashing is eliminated. Laser heating of the liquid just before or just after impact onto the substrate increases the viscosity of the liquid. The increased viscosity allows for deposition of structures with increased line height, and also enables printing of three-dimensional structures. The line height is then dependent on the incident laser power, the liquid deposition rate, and the substrate speed.

Direct Printing of UV Curable Inks

In one embodiment of Laser-Assisted Liquid Jet Deposition, the inner liquid is a UV curable ink. Focused or unfocused UV or visible laser radiation is directed onto the jet so that in-flight curing of the ink (core liquid) is accomplished. The laser radiation may also be focused onto the substrate deposition zone to promote real time curing of the deposited ink. A subsequent substrate heating step removes any residual sheath liquid from the substrate surface.

Direct Printing of Films and Discreet Structures

The microfluidic jet device, microjet, is capable of printing continuous lines on a substrate. If the substrate is placed some distance beneath the liquid jet such that the distance is above the point of initiation of Rayleigh instabilities, a continuous line is written as the substrate is moved. The width of the line depends on the device parameters, the fluid parameters, and the substrate speed. The microfluidic jet device is capable of operating at print speeds of approximately 1 to 5000 mm/sec.

Planar Flow Cell Structure with Chevron Groves to Effect Focusing of the Inner Core Liquid It has been shown that hydrodynamic focusing is achieved in a planar structure when a series of chevron or v-shaped grooves is introduced in the flow cell after the sheath and core liquids are combined. Mott et. al. [U.S. Pat. No. 8,361,413] disclose the design of a planar flow cell, where in the sheath and core flows are introduced side by side, but form an annular configuration as the flows pass the chevrons. Although the sheath and core liquids are introduced in a planar channel where the sheath does not surround the core material, the chevrons force the sheath material to surround the core liquid and cause hydrodynamic focusing to occur. In one embodiment of the invention, the flow cell is made using a planar fabrication technique. The addition of chevron grooves in the planar structure allows the core liquid to be focused with a shaped cross-section. Allowable configurations include, but are not limited to circular and square cross sections. Using a planar fabrication technology to produce flow cells simplifies the manufacture of the flow cells and also enables the manufacture of closely-spaced arrayed flow cells.

3D Printing

The present invention can also be used to build three-dimensional structures using a layer-wise process, wherein simple and complex objects are printed directly from a computer-automated drawing (CAD) file. In the 3D printing process, laser-assisted deposition or a viscoelastic ink is used to deposit a liquid filament with a viscosity sufficient to form a rigid or semi-rigid structure upon which subsequent layers are deposited. In the 3D printing technique, a digital model of an object is intersected with horizontal planes. The horizontal planes form cross sectional representations or slices of the object. Information in each slice is uploaded to a computerized motion control system, so that a solid object can be fabricated using an additive manufacturing process. The Liquid Jet process can be used to fabricate three-dimensional objects from materials including, but not limited to metals, ceramics, and plastics.

3-D Structures for Medical Applications

In yet another embodiment the hydrodynamic focusing flow cell could be used to produce structures for medical applications. The flow cell technology could be used to produce scaffolding for tissue engineering applications. The same flow cell could also be used to print living cells and nutrients for those cells in tissue engineering applications.

The invention claimed is:

1. An apparatus for direct printing of features on a surface using a hydrodynamically focused liquid jet consisting of a sacrificial sheath liquid and a core liquid, the apparatus comprising;

a print head consisting of pressurized liquid reservoirs for the sheath and core liquids, a flow cell that forms an annular distribution of the sheath and core liquids, and an exit orifice from which an annular jet propagates for a distance of at least approximately five centimeters;

a means for controlling the flow rates of the sheath and core liquids independently, so that the diameter of the filament of focused core liquid is approximately 0.10 to 0.75 times the diameter of the exit orifice;

a heater assembly for the purpose of superheating the sheath liquid within the print head;

a means to enable digital shuttering of the core liquid within the flow cell, while leaving the sheath flow uninterrupted;

an external shutter that interrupts or deflects the annular jet or the sheath jet so that discreet features are produced.

2. The apparatus of claim 1 having a substrate platen attached to a motion control system and positioned at a distance from the flow cell exit orifice that is less than the jet breakup distance, for the purpose of producing patterned deposition on the substrate.

3. The apparatus of claim 1 having a monitoring system with pneumatic and optical sensors and a feedback loop to achieve pressure stabilization within the flow cell.

4. The apparatus of claim 1 having an external jet heater for the purpose of evaporating residual sheath liquid.

5. The apparatus of claim 1 having a flow cell internal orifice or external exit orifice formed from a hollow core optical fiber.

6. The apparatus of claim 1 having a laser/optic system that changes the rheology of the core liquid at the substrate.

7. The apparatus of claim 1 having a substrate heater that increases the viscosity of the core liquid and evaporates residual sheath liquid.

8. The apparatus of claim 1 wherein the flow cell consists of a planar channel with chevron grooves.

9. A method of direct pattering of a liquid filament on a surface comprising:
   forming an annular flow of two liquids within a flow cell, with the flow consisting of a sheath flow and an inner flow;
   hydrodynamically focusing the inner liquid;
   forming an annular compound jet of the sheath and inner liquids by passing the flow through a flow cell exit orifice, with said jet propagating intact for at least approximately five centimeters from the flow cell exit orifice;
   superheating a pressurized sheath flow, such that the compound jet undergoes rapid vaporization of the outer sheath flow as the jet is released into ambient pressure;
   interrupting the propagation of the compound jet by valving the inner liquid while maintaining the flow of the sheath liquid, by valving the inner liquid and shuttering the sheath liquid, or by shuttering the compound jet;
   placing a heated substrate with at least two degrees of freedom in the path of the intact jet at a distance less than the breakup distance of the jet, so that a filament of the inner liquid is deposited on the substrate.

10. The method of claim 9 including monitoring and maintaining the stability of the jet using a feedback loop to measure the jet diameter and to adjust the liquid flow rates.

11. The method of claim 9 wherein the inner flow is focused to a diameter equal to 0.05 to 0.80 times the diameter of the flow cell exit orifice.

12. The method of claim 9 including the provision of an inner liquid consisting of a viscoelastic liquid that undergoes an increase in viscosity as the compound jet exits the flow cell orifice.

13. The method of claim 9 including heating the substrate so that residual sheath fluid is evaporated.

14. The method of claim 9, wherein a three-dimensional structure is fabricated from a CAD file in a layer-wise fashion.

15. A method of direct pattering of a liquid filament on a substrate comprising:
   forming an annular flow of two liquids within a flow cell, with the flow consisting of sheath flow and an inner flow;
   hydrodynamically focusing the inner liquid;
   forming an annular compound jet of the sheath and inner liquids, with said jet propagating intact for at least approximately five centimeters from the flow cell exit orifice;
   superheating a pressurized sheath flow, such that the compound jet undergoes rapid vaporization of the outer sheath flow as the jet is released into ambient pressure;
   providing a laser processing step wherein the volatile components of the inner liquid are selectively evaporated after the compound jet exits the flow cell orifice;
   interrupting the propagation of the compound jet by valving the inner liquid while maintaining the flow of the sheath liquid, by valving the inner liquid and shuttering the sheath liquid, or by shuttering the compound jet;
   placing a substrate on a motion platform with at least two degrees of freedom in the path of the intact jet at a distance less than the breakup distance of the jet, so that a filament of the inner liquid is deposited on the substrate, and residual sheath liquid is evaporated from the substrate surface.

16. The method of claim 15 including monitoring and maintaining the stability of the jet using a feedback loop to determine the jet diameter and to adjust the liquid flow rates.

17. The method of claim 15 wherein a substrate heater is used to evaporate residual sheath liquid.

18. The method of claim 15 wherein a three-dimensional structure is fabricated from a CAD file in a layer-wise fashion.

19. The method of claim 15 wherein a 3D scaffolding is produced for tissue engineering applications.

* * * * *